United States Patent
Cox et al.

(10) Patent No.: US 7,234,830 B1
(45) Date of Patent: Jun. 26, 2007

(54) OPTICAL SWITCH

(75) Inventors: Raleigh I. Cox, Baton Rouge, LA (US);
Christopher E. Cox, Baton Rouge, LA (US)

(73) Assignee: Cox Research & Technology, Inc., Baton Rouge, LA (US)

( * ) Notice: Subject to any disclaimer, the term of this patent is extended or adjusted under 35 U.S.C. 154(b) by 10 days.

(21) Appl. No.: 11/241,909

(22) Filed: Oct. 3, 2005

(51) Int. Cl.
*F21V 33/00* (2006.01)

(52) U.S. Cl. ............... 362/101; 362/802; 73/290 R; 340/619; 250/573; 250/900; 250/901

(58) Field of Classification Search ............ 362/101, 362/802; 73/290 R; 340/619; 356/436–442; 250/573–577, 900–908, 231.1
See application file for complete search history.

(56) References Cited

U.S. PATENT DOCUMENTS

| | | | |
|---|---|---|---|
| 3,863,067 A | * | 1/1975 | Gooley .................. 33/366.16 |
| 4,051,723 A | * | 10/1977 | Head et al. ............. 73/861.05 |
| 4,064,754 A | | 12/1977 | Frey |
| 4,091,671 A | | 5/1978 | McLees |
| 4,519,257 A | * | 5/1985 | Simpkins ................ 73/861.04 |
| 4,856,874 A | | 8/1989 | Tusting |
| 4,938,590 A | | 7/1990 | Ishida |
| 5,017,748 A | | 5/1991 | Sapiro |
| 5,373,153 A | * | 12/1994 | Cumberledge et al. .. 250/231.1 |
| 5,874,899 A | | 2/1999 | Barmore et al. |

\* cited by examiner

*Primary Examiner*—Laura Tso
(74) *Attorney, Agent, or Firm*—Jones, Walker, Waechter, Poitevent, Carrer, & Denegre, L.L.P.

(57) ABSTRACT

An optical switch having a housing, a light source and a light detector. The light source and light detector are located remote from the housing. The light source is connected to the housing with a first light guide, and the light detector is connected to the housing with a second light guide. The first and second light guide cables have distal ends positioned through the housing and are optically aligned but separated by a gap. The switch includes a device to interrupt a light beam that is usually adapted to removably occupy the gap.

14 Claims, 3 Drawing Sheets

OPTICAL FLOAT SWITCH

DETAIL A

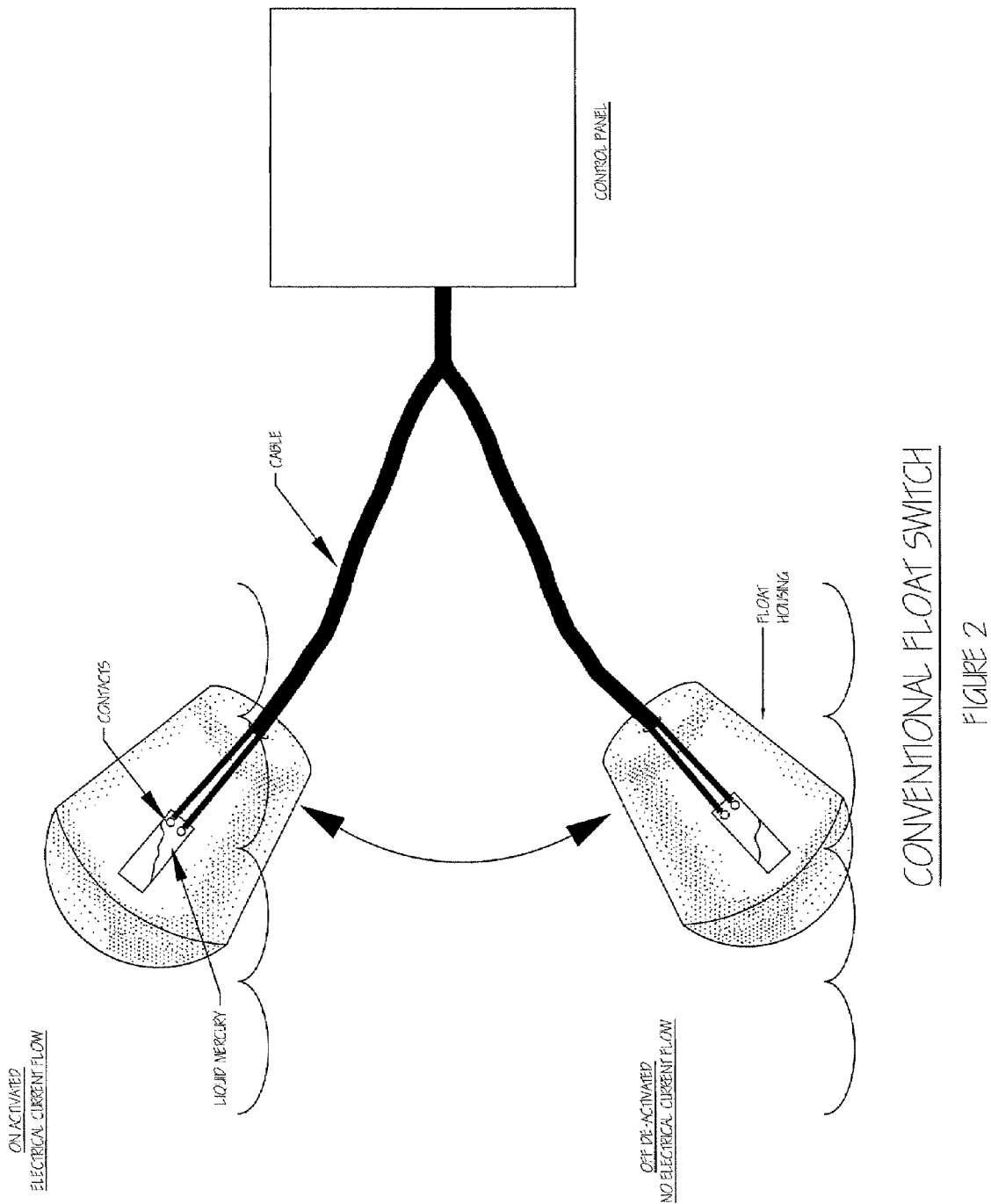

OPTICAL SWITCH

FIELD OF INVENTION

The invention relates to liquid level detection in a hazardous atmosphere. In particular, the invention uses a light beam from a transmitter located outside of the hazardous atmosphere which travels through a fiber optic cable into a hazardous area and travels back out of the hazardous area to a receiver that can detect the light beam.

BACKGROUND OF THE INVENTION

Pumping stations or tanks that contain hazardous and/or flammable or volatile liquids and chemicals to be pumped at predetermined levels are capable of containing gases that could explode if an electrical arc becomes present. Float switches are commonly used in this application to detect level for activation of a pump (see FIG. 2), but must have electrical current that passes through wires and a switch housed within the float. Wires from the float switch run to a control panel located external to the tank or pit and is located outside the hazardous area. As liquids rises in the tank the float tilts and a ball or conductive liquid, such as mercury, moves and makes contact with an electrical switch or contacts of some sort causing the switch to activate. Electrical current then passes from the control panel through the wires, to the switch, completing the circuit. These all cause a spark within the float that could cause an explosion if the float malfunctions. The wires leading to the float are also a source of arcing which can occur if the wires are damaged.

Some tanks containing flammable liquids or gases use ultra sonic level detection which sends a sonic burst to the surface of the liquid and then back. The transit time of the beam is used to determine the liquid level. No electrical current is used within the tank or pit and the transmitter and receiver are located external to the hazardous atmosphere. This method is not generally used to remotely signal a device, such as a signal to engage/disengage a pump (such as a dosing pump) at discrete levels, as these level detectors will detect all heights and hence additional logic circuits are needed to select a predetermined height for operation of a pump, thereby raising the complexity and expense of such as system.

SUMMARY OF THE INVENTION

The invention is an optically activated switch for use in a hazardous environment, and in particular, to signal the need to operate a pump. The invention uses a light beam from a transmitter located outside of the hazardous atmosphere which travels through a light carrying cable, tube or light guide (all considered a "light guide") to a float means located in a hazardous area, where the light can travel outside of the hazardous area to a light sensitive receiver. Several means of breaking or interrupting the light can be utilized.

OBJECTS OF THE INVENTION

It is an object of the invention to have a switch using no source of electrical current or electrical resistance within a hazardous environment.

BRIEF DESCRIPTION OF THE DRAWINGS

FIG. 1A depicts a detail of the float of FIG. 1.
FIG. 2 depicts a conventional float.

DETAILED DESCRIPTION OF THE INVENTION

Figure 1:
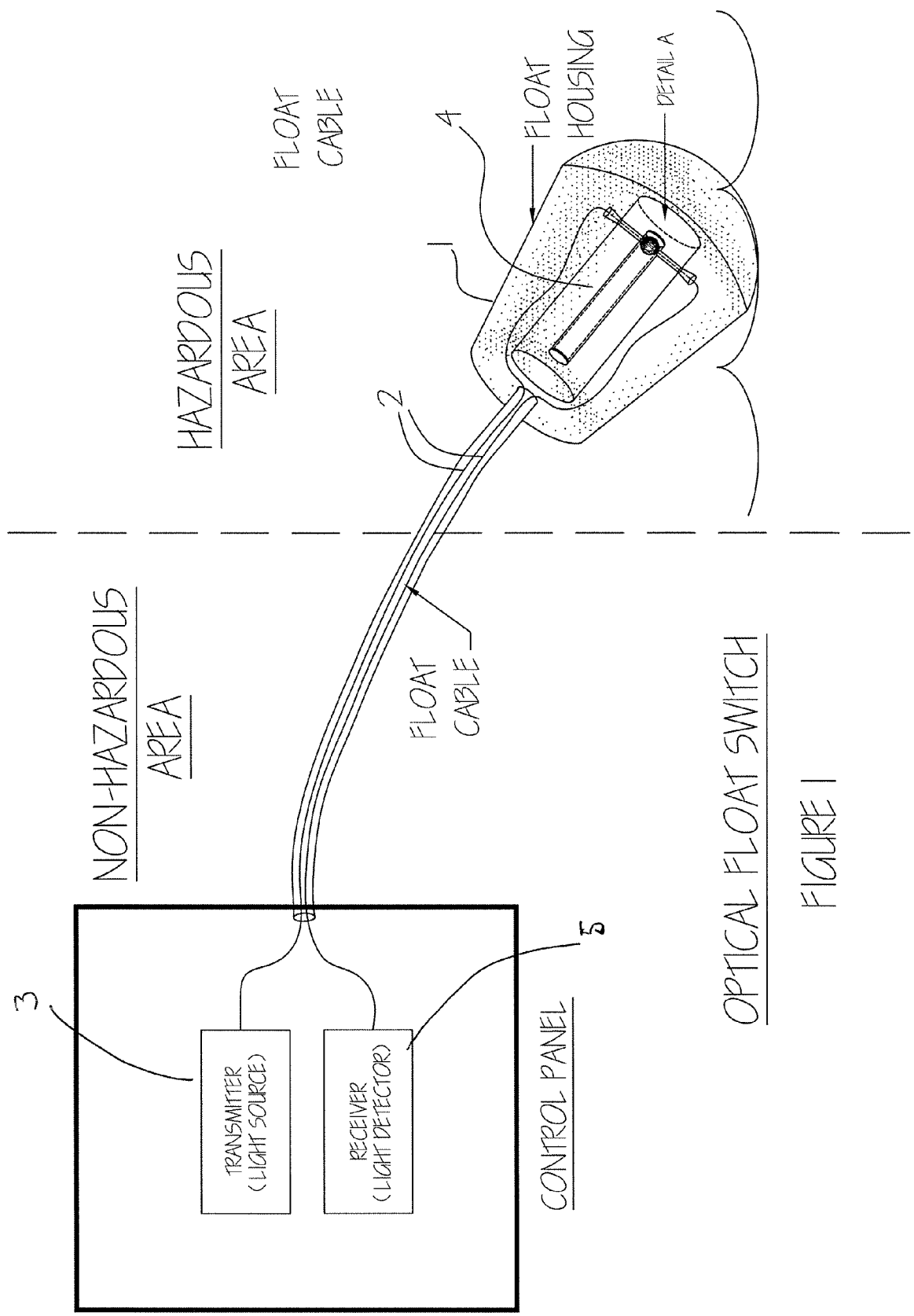
FIG. 1 depicts an optically activated float.
Figure 1:
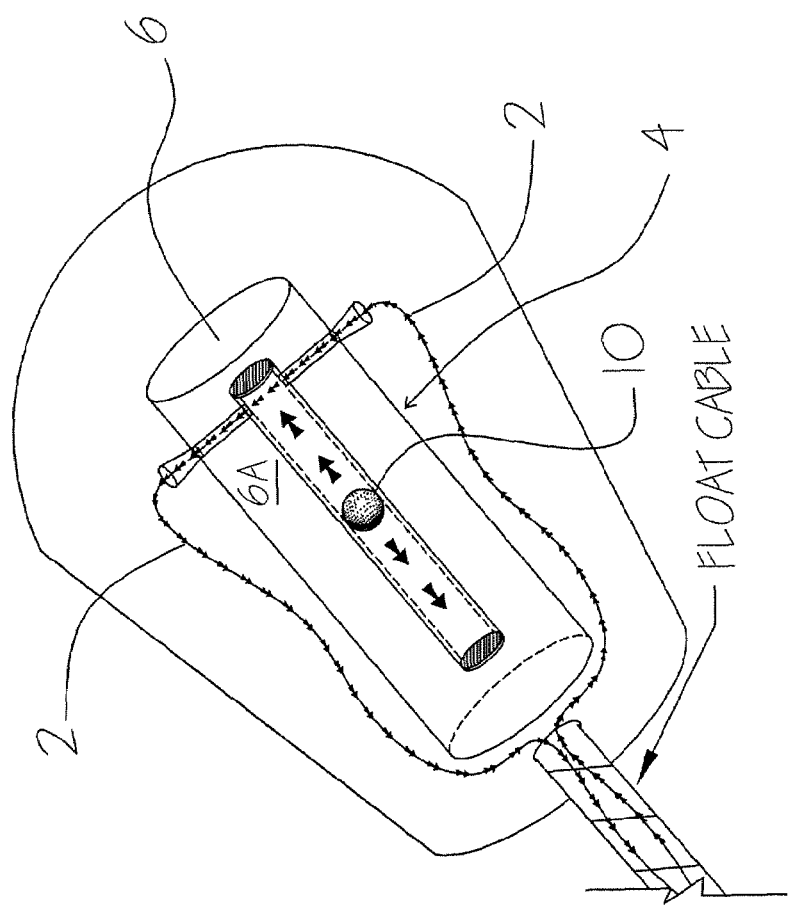

Shown in FIG. 1 is an embodiment of the invention. The invention includes a housing 1, two light guides 2 (hereafter described as fiber optic cables), a light source 3, and a means to interrupt the beam 4. The two cables 2 are positioned on the housing 1. Each cable terminates at or within the floating housing 1. The terminal ends of the cables are attached to a separator assembly 6 that positions the terminal ends of the two cables near each other, but separated by a gap 10. (see FIG. 1, detail A). The gap 10 is generally positioned in the separator assembly 6 within the side the housing 1. The gap can vary in size, with 0.01–0.5 inch suitable for most applications. The ends of the two fiber optic cables should be "optically aligned" (that is, light emitted from one terminal end will travel though the gap (possibly along a zig-zag path if reflective material such as mirrors are employed) and a portion of the transmitted light will enter the terminal end of the second cable) The separator assembly 6 generally includes an internal chamber 6A with one fiber cable 2 terminal end positioned in or on the wall of the interior chamber and the other fiber optic cable 2 terminal end positioned on an opposite wall of the internal chamber 6A, with the two ends optically aligned. In the embodiment shown in FIG. 1, the housing 1 is floatable, and the cables "tether" the housing 1, allowing the float to rise and fall with the media for a range of elevations. One of the fiber optic cables is connected to a light source 3, and the other cable is connected to a light detector 5. The light source 3 can be any suitable source, such as a laser, incandescent light bulb, sun, or a light emitting diode. Preferably the light source 3 and light receiver 5 will be located external to the hazardous area in a control panel, and only the fiber optic cables will travel into the hazardous area to the housing 1.

As shown in the Detail A of FIG. 1, the internal chamber 6A of the separator assembly 6 creates the needed gap between the fiber optic cables 2 terminal ends. Located within the internal chamber 6A is a means to interrupt a light beam 10, such as a rollable or slidable ball or bar, or opaque fluid positioned within the internal chamber. If the housing floats, at a certain level the floating housing will tilt (as it is tethered by action of the cables) and as it tilts, the means to interrupt a light beam will move within the internal chamber. If the degree of movement is sufficient, the means to interrupt the light beam will block (or unblock) the light path between the two terminal ends of the fiber optic cables 2. Additionally, if the housing 1 is a fixed device (that is, it does not float on the media but is fixed at a desired height), the means to interrupt a light beam can be a floating arm or floating barrier positioned in the internal chamber 6A of the housing: as the water level rises up to the level of the housing, the floating arm or barrier will rise (much like a floating limit switch) to block the light beam (or unblock the light beam). In this instance, the switch will have a means to fix the elevation of the housing, such as a clamp to attach the switch to a structure in the hazardous environment, such as a dosing pump or to the container storing the hazardous material.

A floating housing 1 can be constructed in any number of ways. One such way would be to use two part foam in a mold incasing the separator assembly within. It also could be constructed of two halves fused together by glue or heat also containing the separator assembly. Any object that floats could be drilled or carved out and the separator assembly could be inserted inside and then sealed using any number of means.

The receiver or detector 5 can be located external to the hazardous area in a control panel and is not required to be located with the light source. Any number of commercially available devices that are sensitive to light energy, such as devices containing a photo eye or photo transistor, are suitable as a light detector or receiver. Hence, the presence or absence of light at the receiver is indicative of the position of the floating housing in the hazardous environment and can be utilized as a signal means to perform a specific task such as starting or stopping a pump.

In this fashion, the components of the optical switch are electrically isolated from the hazardous environment, and the only energy present is a light beam. In a hazardous environment, such an optical switch presents a safe and economic alternative to conventional switches using an electrical contact in the hazardous environment, presenting a potential source of electric spark and ignition within the hazardous environment.

We claim:

1. An optical switch comprising a housing having an interior, a powered light source and a powered light detector, said light source and light detector located remote from said housing, said light source connected to said housing with a first light guide, said light detector connected to said housing with a second light guide, said first and second light guides having distal ends positioned into said housing and said distal ends being optically aligned but separated by a gap within said interior and a means to interrupt a light beam, said means to interrupt a light beam adapted to removably occupy said gap.

2. The optical switch of claim 1 wherein said distal ends of said light guides are located in a separator assembly connected to said housing, said separator assembly having a hollow interior portion.

3. The optical switch of claim 2 wherein said means to interrupt a light beam path is a rollable ball positioned in said interior of said separator assembly.

4. The optical switch of claim 2 wherein said means to interrupt a light beam path is an opaque fluid positioned in said interior of said separator assembly.

5. The optical switch of claim 1 wherein said housing is floatable.

6. The optical switch of claim 2, wherein said means to interrupt a light beam path is a slidable bar.

7. The optical switch of claim 2, wherein said light receiver is a photo eye.

8. The optical switch of claim 2 wherein said light source is a light emitting diode.

9. The optical switch of claim 1 having an attachment means to fix the elevation of said housing.

10. A method of detecting the level of a liquid in a hazardous explosion prone environment comprising deploying the optical switch of claim 1 in a hazardous explosion prone environment, and emitting a light from said light source located remote from said hazardous explosion prone environment for transmission by said first light guide, and examining said second light guide with said light receiver at a location remote from said hazardous explosion prone environment for the presence or absence of a light.

11. The optical switch of claim 1 wherein said housing is a float adapted to float in a liquid.

12. The optical switch of claim 1 said further having a flexible tether attached to said housing.

13. The method of claim 10 wherein said hazardous environment is within a pumping station or treatment tank.

14. The method of claim 10 wherein said optical switch has a status of light detected or light not detected, and said status is used to operate a pump.

* * * * *